(12) United States Patent
Sanji et al.

(10) Patent No.: US 11,467,028 B2
(45) Date of Patent: Oct. 11, 2022

(54) ROAD SURFACE STATE DETERMINATION DEVICE

(71) Applicant: DENSO CORPORATION, Kariya (JP)

(72) Inventors: Kenichiro Sanji, Kariya (JP); Yoichiro Suzuki, Kariya (JP); Hidenori Osai, Kariya (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 96 days.

(21) Appl. No.: 16/910,778

(22) Filed: Jun. 24, 2020

(65) Prior Publication Data

US 2020/0319020 A1 Oct. 8, 2020

Related U.S. Application Data

(63) Continuation of application No. PCT/JP2018/047408, filed on Dec. 24, 2018.

(30) Foreign Application Priority Data

Dec. 28, 2017 (JP) .............................. JP2017-254282

(51) Int. Cl.
  *G01H 11/08* (2006.01)
  *B60C 19/00* (2006.01)
  *G01P 15/00* (2006.01)

(52) U.S. Cl.
  CPC ............. *G01H 11/08* (2013.01); *B60C 19/00* (2013.01); *G01P 15/00* (2013.01); *B60C 2019/004* (2013.01)

(58) Field of Classification Search
  None
  See application file for complete search history.

(56) References Cited

U.S. PATENT DOCUMENTS

2009/0105921 A1   4/2009   Hanatsuka et al.
2015/0210286 A1   7/2015   Hanatsuka et al.
(Continued)

FOREIGN PATENT DOCUMENTS

JP    2014035279 A    2/2014
JP    2016-076085 A   5/2016
(Continued)

OTHER PUBLICATIONS

U.S. Appl. No. 16/929,862, filed Jul. 15, 2020, Yoichiro Suzuki.
(Continued)

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A road surface state determination device includes a tire-side device and a vehicle-body-side system. The tire-side device is attached to each of a plurality of tires included in a vehicle. The vehicle-body-side system is included in a body of the vehicle. The tire-side device may output a detection signal corresponding to a magnitude of vibration applied to the tire. The tire-side device may extract data items of a road surface state indicative of the vibration of the tire during one rotation of the tire from the detection signal. The tire-side device may generate road surface data. The tire-side device may transmit the road surface data. The vehicle-body-side system may receive the road surface data. The vehicle-body-side system may determine the road surface state based on the road surface data.

9 Claims, 8 Drawing Sheets

(56) References Cited

U.S. PATENT DOCUMENTS

| | | | |
|---|---|---|---|
| 2018/0264894 A1 | 9/2018 | Goto et al. | |
| 2019/0185008 A1* | 6/2019 | Kanbayashi | B60C 23/00 |
| 2020/0317204 A1* | 10/2020 | Kanbayashi | G01H 11/08 |
| 2020/0391559 A1 | 12/2020 | Suzuki et al. | |

FOREIGN PATENT DOCUMENTS

| | | |
|---|---|---|
| JP | 2016-107833 A | 6/2016 |
| JP | 2017198507 A | 11/2017 |
| WO | WO-2006135090 A1 | 12/2006 |
| WO | WO-2019142868 A1 | 7/2019 |

OTHER PUBLICATIONS

U.S. Appl. No. 16/859,524, filed Apr. 27, 2020, Sekizawa.
U.S. Appl. No. 16/859,799, filed Apr. 27, 2020, Sekizawa.
U.S. Appl. No. 16/904,260, filed Jun. 17, 2020, Suzuki et al.

* cited by examiner

FIG. 10

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \begin{matrix} \text{— C1} \end{matrix}$$

FIG. 11

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \text{— C2}$$

FIG. 12

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \text{— C3}$$

ROAD SURFACE STATE DETERMINATION DEVICE

CROSS REFERENCE TO RELATED APPLICATIONS

The present application is a continuation application of International Patent Application No. PCT/JP2018/047408 filed on Dec. 24, 2018, which designated the U.S. and claims the benefit of priority from Japanese Patent Application No. 2017-254282 filed on Dec. 28, 2017. The entire disclosures of all of the above applications are incorporated herein by reference.

TECHNICAL FIELD

The present disclosure relates to a road surface state determination device which detects vibration applied to a tire by a tire-side device, generates road surface data indicative of a road surface state based on vibration data, transmits the road surface data to a vehicle-body-side system, and determines the road surface state based on the road surface data.

BACKGROUND

A road surface state determination device that includes an acceleration sensor attached to a back surface of a tread of a tire, detects vibration applied to the tire using the acceleration sensor, and estimates a road surface state based on a detection result of the vibration has been proposed. The road surface state determination device generates data related to the road surface state based on a waveform of the vibration applied to the tire and detected by the acceleration sensor, and transmits the data for each of wheels to a vehicle-body-side receiver or the like to estimate the road surface state.

SUMMARY

The present disclosure provides a road surface state determination device. The road surface state determination device includes a tire-side device and a vehicle-body-side system. The tire-side device is attached to each of a plurality of tires included in a vehicle. The vehicle-body-side system is included in a body of the vehicle. The tire-side device may output a detection signal corresponding to a magnitude of vibration applied to the tire. The tire-side device may extract data items of a road surface state indicative of the vibration of the tire during one rotation of the tire from the detection signal. The tire-side device may generate road surface data. The tire-side device may transmit the road surface data. The vehicle-body-side system may receive the road surface data. The vehicle-body-side system may determine the road surface state based on the road surface data.

BRIEF DESCRIPTION OF DRAWINGS

The features and advantages of the present disclosure will become more apparent from the following detailed description made with reference to the accompanying drawings. In the drawings:

FIG. 10 is an exemplary diagram illustrating selection of feature quantities;

FIG. 11 is an exemplary diagram illustrating selection of feature quantities; and FIG. 12 is an exemplary diagram illustrating selection of a feature quantity.

DETAILED DESCRIPTION

Figure 1:
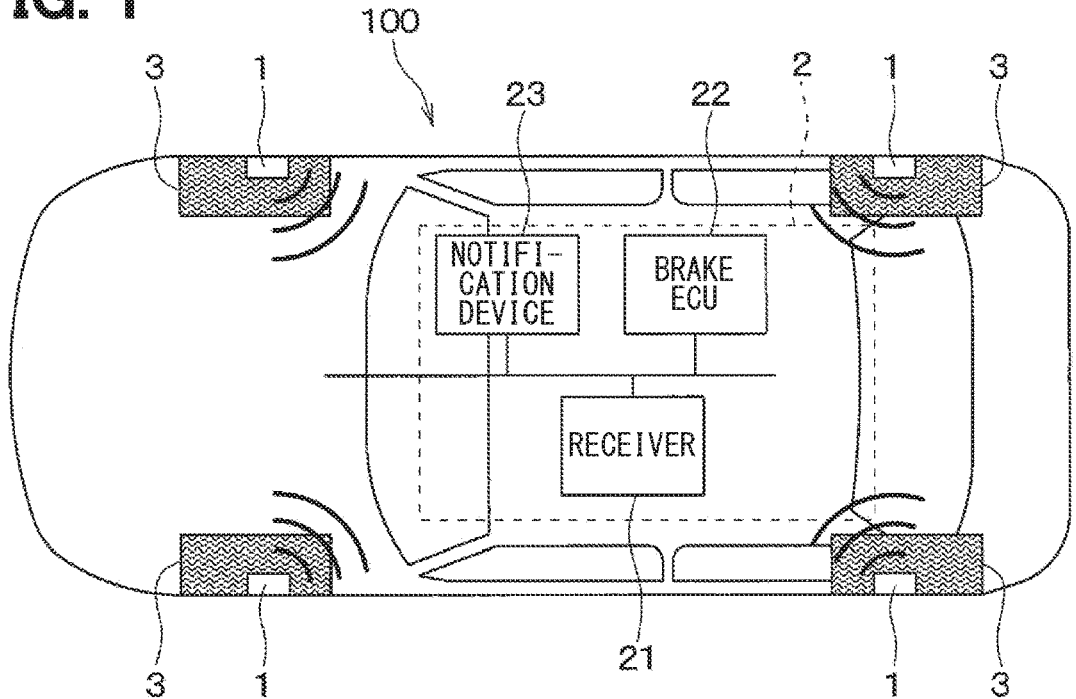
FIG. 1 is a block diagram illustrating a tire system to which a tire-side device according to a first embodiment is applied in a state where the tire system is mounted in a vehicle.

For example, an exemplary road surface state determination device extract, as data related to a road surface state, feature vectors from waveform of vibration which is applied to a tire and detected by an acceleration sensor. The feature vectors are obtained by segmenting a detection signal from the acceleration sensor by each of time windows having a predetermined time width and extracting a frequency component of the detection signal in each of the time windows. Then, the extracted feature vectors are transmitted to a vehicle-body-side receiver, and degrees of similarity of the feature vectors to all the support vectors stored for each type of the road surface are calculated to determine the road surface state. For example, the degrees of similarity of the extracted feature vectors to all the support vectors are calculated using a kernel function, and the type of the road surface having the highest degree of similarity, e.g., a dry road surface, a wet road surface, or the like is determined as a currently traveled road surface state.

However, the tire-side device such as the acceleration sensor attached to the tire transmits, to the vehicle-body-side receiver, data related to the road surface state which includes all the feature vectors. Accordingly, a transmission time period is increased so that responsiveness is degraded. Consequently, the road surface state cannot be determined with good responsiveness. Thus, the road surface state cannot promptly be reported to a driver and highly responsive vehicle control based on the road surface state cannot be performed.

In addition, since the tire-side device is provided at a position physically distant from a vehicle body, it is required to reduce power consumed in a power source unit. However, when the transmission time period is increased, the power consumption is increased. When a battery is used as the power source unit, replacement of the battery is not easy.

Thus, a further reduction in power consumption is required. Increased power consumption is not preferable.

The present disclosure provides a road surface state determination device which allows a reduction in transmission time period for data when a tire-side device transmits the data.

An exemplary embodiment of the present disclosure provides a road surface state determination device. The road surface state determination device includes a tire-side device and a vehicle-body-side system. The tire-side device is attached to each of a plurality of tires included in a vehicle. The vehicle-body-side system is included in a body of the vehicle. The tire-side device includes a vibration detection unit, a control unit, and a first data communication unit. The vibration detection unit is configured to output a detection signal corresponding to a magnitude of vibration applied to the tire. The control unit includes a waveform processing unit and a data selection unit. The waveform processing unit is configured to extract data items of a road surface state indicative of the vibration of the tire during one rotation of the tire from the detection signal. The data selection unit is configured to select, as a partial data item, a data item having a higher feature degree for the road surface state from the data items and generate road surface data including the partial data item during one rotation of the tire. The first data communication unit is configured to transmit the road surface data. The vehicle-body-side system includes a second data communication unit and a road surface determination unit. The second data communication unit is configured to receive the road surface data transmitted from the first data communication unit. The road surface determination unit is configured to determine the road surface state based on the partial data item included in the road surface data.

In the exemplary embodiment of the present disclosure, the road surface state determination device causes the tire-side device to transmit the road surface data including the partial data item during one tire rotation. The vehicle-body-side system determines the road surface state based on the road surface data. As a result, the road surface state determination device reduces a transmission time period when the tire-side device transmits the data.

Hereinafter, some embodiments of the disclosure are described with reference to the accompanying drawings. In the following embodiments, the same or equivalent parts are designated by like reference signs for explanation.

First Embodiment

Referring to FIGS. 1 to 9, a description will be given of a tire system 100 having a road surface state determination function according to a first embodiment. The tire system 100 according to the first embodiment determines a road surface state during driving based on vibration applied to a ground contact surface of a tire provided in each of wheels of a vehicle, and also performs warning of danger to the vehicle, vehicle movement control, and the like based on the road surface state.

Figure 2:
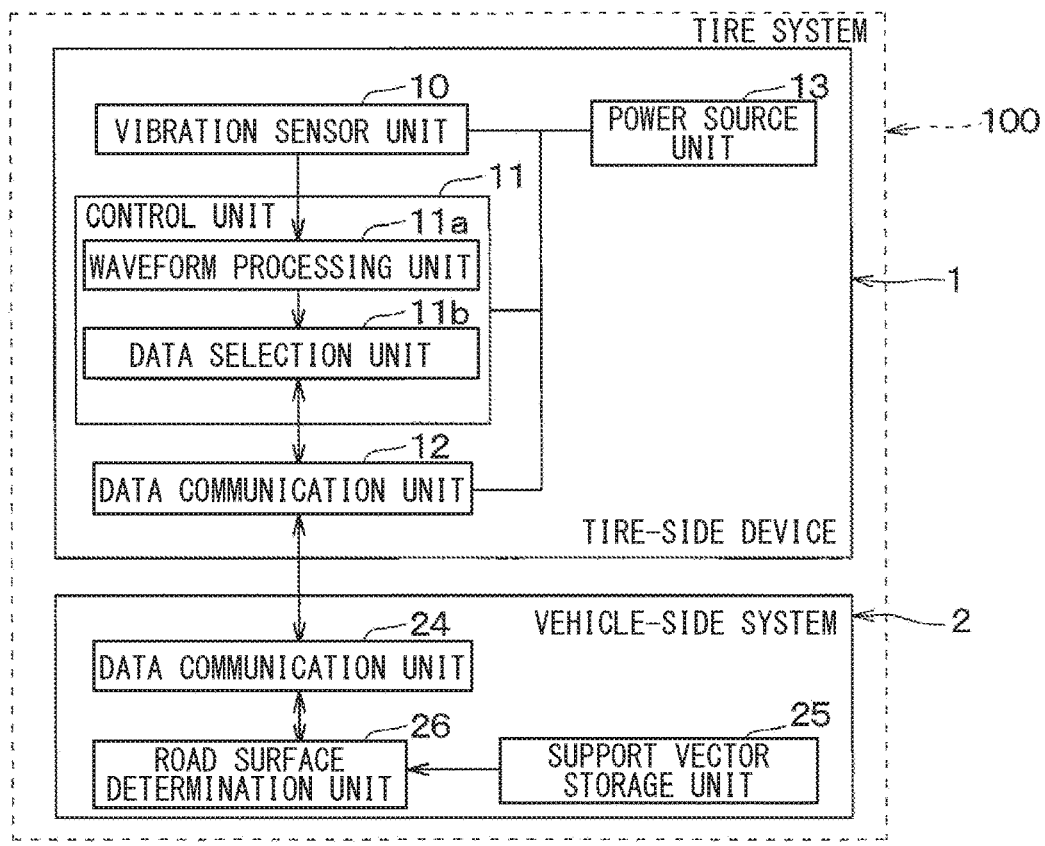
FIG. 2 is a block diagram illustrating the tire-side device and a vehicle-body-side system.

As illustrated in FIGS. 1 and 2, the tire system 100 is configured to include a tire-side device 1 provided in a wheel and a vehicle-body-side system 2 including individual units provided in a vehicle body. The vehicle-body-side system 2 includes a receiver 21, an electronic control device for brake control (hereinafter referred to as a brake ECU) 22, a notification device 23, and the like. Note that a portion of the tire system 100 which implements the road surface state determination function corresponds to a road surface state determination device. In the first embodiment, the tire-side device 1 and the receiver 21 of the vehicle-body-side system 2 are included in the road surface state determination device.

The tire system 100 of the first embodiment causes each of the tire-side device 1 to transmit data (hereinafter referred to as road surface data) depending on a road surface state on which a tire 3 is traveling, and also causes the receiver 21 to receive the road surface data and determine the road surface state. The tire system 100 also transmits a result of the determination of the road surface state by the receiver 21 to the notification device 23, and causes the notification device 23 to report the result of the determination of the road surface state. As a result, it becomes possible to report a road surface state such as, e.g., a dry road, a wet road, a snow-covered road, or a frozen road to a driver and also warn the driver when the road has a slippery road surface. The tire system 100 also reports the road surface state to the brake ECU 22 which performs vehicle movement control or the like to cause the brake ECU 22 or the like to perform the vehicle movement control for avoiding danger. For example, when the road is frozen, the brake ECU 22 or the like is caused to reduce a braking force generated based on an amount of brake operation compared to that when the road is dry and thus perform the vehicle movement control corresponding to a case where a road surface p is low. Specifically, the tire-side device 1 and the vehicle-body-side system 2 are configured as follows.

Figure 3:
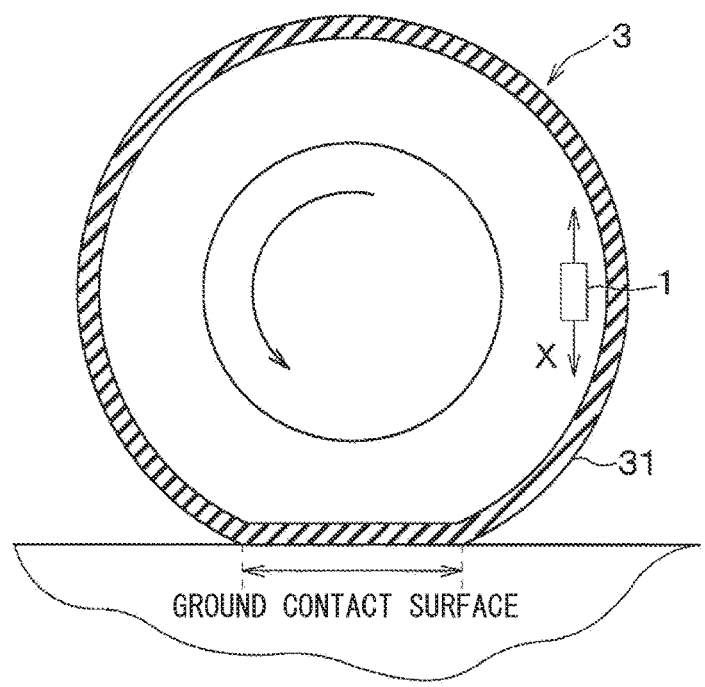
FIG. 3 is a sectional schematic diagram of a tire to which the tire-side device is attached.

As illustrated in FIG. 2, the tire-side device 1 includes a vibration sensor unit 10, a control unit 11, a data communication unit 12, and a power source unit 13. As illustrated in FIG. 3, the tire-side device 1 is provided on a back surface of a tread 31 of the tire 3.

The vibration sensor unit 10 provides a vibration detection unit for detecting the vibration applied to the tire 3. For example, the vibration sensor unit 10 is provided by an acceleration sensor. When the vibration sensor unit 10 is provided by the acceleration sensor, the vibration sensor unit 10 outputs an acceleration detection signal as a detection signal corresponding to a magnitude of vibration in a direction in contact with a circular path followed by the tire-side device 1 when the tire 3 rotates, i.e., a tire tangential direction shown by an arrow X in FIG. 3. More specifically, the vibration sensor unit 10 generates, as the detection signal, an output voltage having one of two directions shown by the arrow X as a positive direction and the opposite direction as a negative direction. For example, the vibration sensor unit 10 detects an acceleration at predetermined sampling periods which are set to be shorter than a period of one rotation of the tire 3, and outputs the detected acceleration as the detection signal. The detection signal from the vibration sensor unit 10 is represented as the output voltage or an output current, and a case where the detection signal is represented as the output voltage is described herein by way of example.

The control unit 11 is provided by a known microcomputer including a CPU, a ROM, a RAM, an I/O, and the like, and performs signal processing of the detection signal based on a program stored in the ROM or the like to generate the road surface data indicative of a road surface state appearing in the detection signal. The control unit 11 is configured to include, as functional units which perform such processes, a waveform processing unit 11a and a data selection unit 11b.

The waveform processing unit 11a is provided by a known microcomputer including a CPU, a ROM, a RAM, an I/O, and the like, performs signal processing of the detection signal based on a program stored in the ROM or the like, and generates the road surface data indicative of the road surface state appearing in the detection signal.

Specifically, the waveform processing unit 11a uses the detection signal output from the vibration sensor unit 10 as the detection signal indicative of vibration data in the tire tangential direction to perform waveform processing of a vibration waveform represented by the detection signal and thus extract feature quantities of the tire vibration. In the first embodiment, by performing the signal processing of the detection signal for the acceleration (hereinafter referred to as the tire G) of the tire 3, the waveform processing unit 11a extracts the feature quantities of the tire G. Note that details of the feature quantity mentioned herein will be described later.

The data selection unit 11b selects partial data item to be transmitted to the vehicle-body-side system 2 from data items indicative of the feature quantities extracted by the waveform processing unit 11a. Then, the data selection unit 11b generates data including the partial data item indicative of some of the feature quantities as the road surface data, and transmits the road surface data to the data communication unit 12. The data selection unit 11b also receives instruction data from the vehicle-body-side system 2, and switches between methods of data selection based on the instruction data. In the first embodiment, at normal times, the data selection unit 11b selects the data item having a highest feature degree from the data items of the feature quantities extracted by the waveform processing unit 11a. When receiving the instruction data, the data selection unit 11b selects all the feature quantities. Note that details of the methods of data selection made by the data selection unit 11b will be described later.

The waveform processing unit 11a and the data selection unit 11b also control data transmission from the data communication unit 12 and cause the data communication unit 12 to perform data communication by transmitting the road surface data to the data communication unit 12 at a time point at which data transmission is necessary. For example, in the waveform processing unit 11a and the data selection unit 11b, each of the extraction of the feature quantities of the tire G and the data selection is performed every time the tire 3 rotates once or a plurality of times. Then, the data selection unit 11b transmits the road surface data including the selected data item indicative of the feature quantity to the data communication unit 12 once or a plurality of times each time the tire 3 rotates once or a plurality of times.

The data communication unit 12 is provided as a first data communication unit. For example, when the road surface data is transmitted from the data selection unit 11b to the data communication unit 12, at that time point, the data communication unit 12 transmits the road surface data. The time point of the data transmission from the data communication unit 12 is controlled by the waveform processing unit 11a and the data selection unit 11b. Every time the road surface data is transmitted from the data selection unit 11b to the data communication unit 12 each time the tire 3 rotates a plurality of times, data transmission from the data communication unit 12 is performed.

The data communication unit 12 is configured to be capable of bidirectional communication and receives data transmitted from the vehicle-body-side system 2. For example, the data communication unit 12 receives the instruction data from the vehicle-body-side system 2 and transmits the instruction data to the data selection unit 11b.

The data communication unit 12 described herein has a single configuration, but may also be configured as a transmission unit and a reception unit which are separate from each other. As a mode of the bidirectional communication, various modes can be used appropriately, and Bluetooth communication including BLE (abbreviation of Bluetooth Low Energy) communication, a wireless LAN (abbreviation of Local Area Network) such as wifi, Sub-GHz communication, ultra-wide band communication, ZigBee, or the like can be used appropriately. Note that "Bluetooth" is a registered trademark.

The power source unit 13 serves as a power source of the tire-side device 1 and supplies power to each of the units included in the tire-side device 1 to operate each of the units. The power source unit 13 is provided by a battery such as, e.g., a button battery. Since the tire-side device 1 is provided in the tire 3, replacement of the battery cannot easily be performed, and therefore it is required to reduce power consumption. It may also be possible to form the power source unit 13 of a power generator, an electrical accumulator, or the like instead of the battery. When the power source unit 13 is configured to have the power generator, there is a fewer difficulty in the battery life when the power source unit 13 is provided by a battery, but it is difficult to generate high power. Accordingly, a task of reducing the power consumption remains the same as when the power source unit 13 is provided by the battery.

Meanwhile, the receiver 21, the brake ECU 22, and the notification device 23 each included in the vehicle-body-side system 2 are driven when an activation switch such as an ignition switch not shown is turned ON.

As illustrated in FIG. 2, the receiver 21 includes a data communication unit 24, a support vector storage unit 25, and a road surface determination unit 26.

The data communication unit 24 is provided by a second data communication unit and performs bidirectional communication with the data communication unit 12 of the tire-side device 1. Specifically, the data communication unit 24 receives the road surface data including the feature quantity and transmitted from the data communication unit 12 and transmits the road surface data to the road surface determination unit 26. The data communication unit 24 also transmits the instruction data when the instruction data is transmitted from the road surface determination unit 26 to the tire-side device 1. The data communication unit 24 described herein has a single configuration, but may also be configured to include a transmission unit and a reception unit which are separate from each other.

The support vector storage unit 25 stores support vectors for each type of the road surface. The support vectors refer to training data, i.e., feature quantities serving as models, which are obtained by, e.g., leaning using a support vector machine. The vehicle including the tire-side devices 1 is experimentally caused to run on each type of the road surface. The feature quantities extracted at that time by the waveform processing unit 11a for a predetermined number of tire rotations are learned and, from the extracted feature quantities, typical feature quantities corresponding to the predetermined number of rotations are extracted to be used as the support vectors. For example, the feature quantities corresponding to 1,000,000 rotations are learned for each type of the road surface and, from the learned feature quantities, typical feature quantities corresponding to 100 rotations are extracted to be used as the support vectors.

The road surface determination unit 26 is provided by a known microcomputer including a CPU, a ROM, a RAM, an I/O, and the like and performs various processes based on programs stored in the ROM or the like to determine the road surface state. Specifically, the road surface determination unit 26 compares, based on the support vector stored in the support vector storage unit 25, the road surface data transmitted from the tire-side device 1 to the support vector to determine the road surface state. In other words, the road surface determination unit 26 compares the feature quantity included in the road surface data to the support vector stored for each type of the road surface to determine the road surface state. For example, the road surface determination unit 26 compares the feature quantity included in the road surface data received most recently to the support vector stored for each type of the road surface, and determines the road surface corresponding to the support vector closest to the feature quantity to be a currently traveled road surface. Note that the method for determining the road surface state will be described later.

When determining the road surface state, the road surface determination unit 26 transmits the determined road surface state to the notification device 23, and causes the notification device 23 to report the road surface state to the driver as required. As a result, the driver tries to drive in consideration of the road surface state and can avoid danger to the vehicle. For example, the receiver 21 may constantly display the determined road surface state through the notification device 23. Alternatively, the notification device 23 may also display the road surface state to warn the driver when the determined road surface state is that of a wet road, a snow-covered road, a frozen road, or the like, in which the driver is required to drive more carefully. In addition, from the receiver 21, the road surface state is transmitted to an ECU for performing the vehicle movement control such as the brake ECU 22 and, based on the transmitted road surface state, the vehicle movement control is performed.

The brake ECU 22 is provided by a braking control device that performs various brake control and drives an actuator for brake fluid pressure control to cause a brake fluid pressure to be automatically generated and applied to a wheel cylinder to thus generate a braking force. The brake ECU 22 can also independently control the braking force of each of the wheels. When the road surface state is transmitted from the receiver 21 to the brake ECU 22, the brake ECU 22 performs control of the braking force as the vehicle movement control based on the road surface state. For example, when the road surface state transmitted to the brake ECU 22 indicates a frozen road, the brake ECU 22 reduces a braking force to be generated based on an amount of the brake operation performed by the driver compared to that when the transmitted road surface state indicates a dry road surface. Thus, it is possible to inhibit a wheel slip and avoid danger to the vehicle.

The notification device 23 is provided by, e.g., a meter indicator or the like and used when the road surface state is reported to the driver. When the notification device 23 is provided by the meter indicator, the meter indicator is disposed at a place where the meter indicator is visually recognizable by the driver while driving the vehicle and disposed in, e.g., an instrument panel in the vehicle. When the road surface state is transmitted from the receiver 21 to the meter indicator, the meter indicator performs display in a mode in which the driver can recognize the road surface state, and thus allows the road surface state to be visually reported to the driver.

Note that the notification device 23 may also be provided by a buzzer, a voice guidance device, or the like. In that case, the notification device 23 can aurally report the road surface state to the driver using a buzzer sound or voice guidance. As the notification device 23 that performs visual reporting, the meter indicator has been described by way of example, but the notification device 23 may also be provided by a display element which displays information, such as a head-up display.

Thus, the tire system 100 according to the first embodiment is configured. Note that the individual units included in the vehicle-body-side system 2 are connected to each other via an in-vehicle LAN (abbreviation of Local Area Network) based on, e.g., CAN (abbreviation of Controller Area Network) communication or the like. This allows the individual units to transmit information to each other via the in-vehicle LAN.

Next, a description will be given of details of the feature quantity extracted by the control unit 11 described above.

The feature quantity mentioned herein is a quantity indicative of a feature of vibration applied to the tire 3, which has been acquired by the vibration sensor unit 10, and is represented as, e.g., a feature vector.

Figure 4:
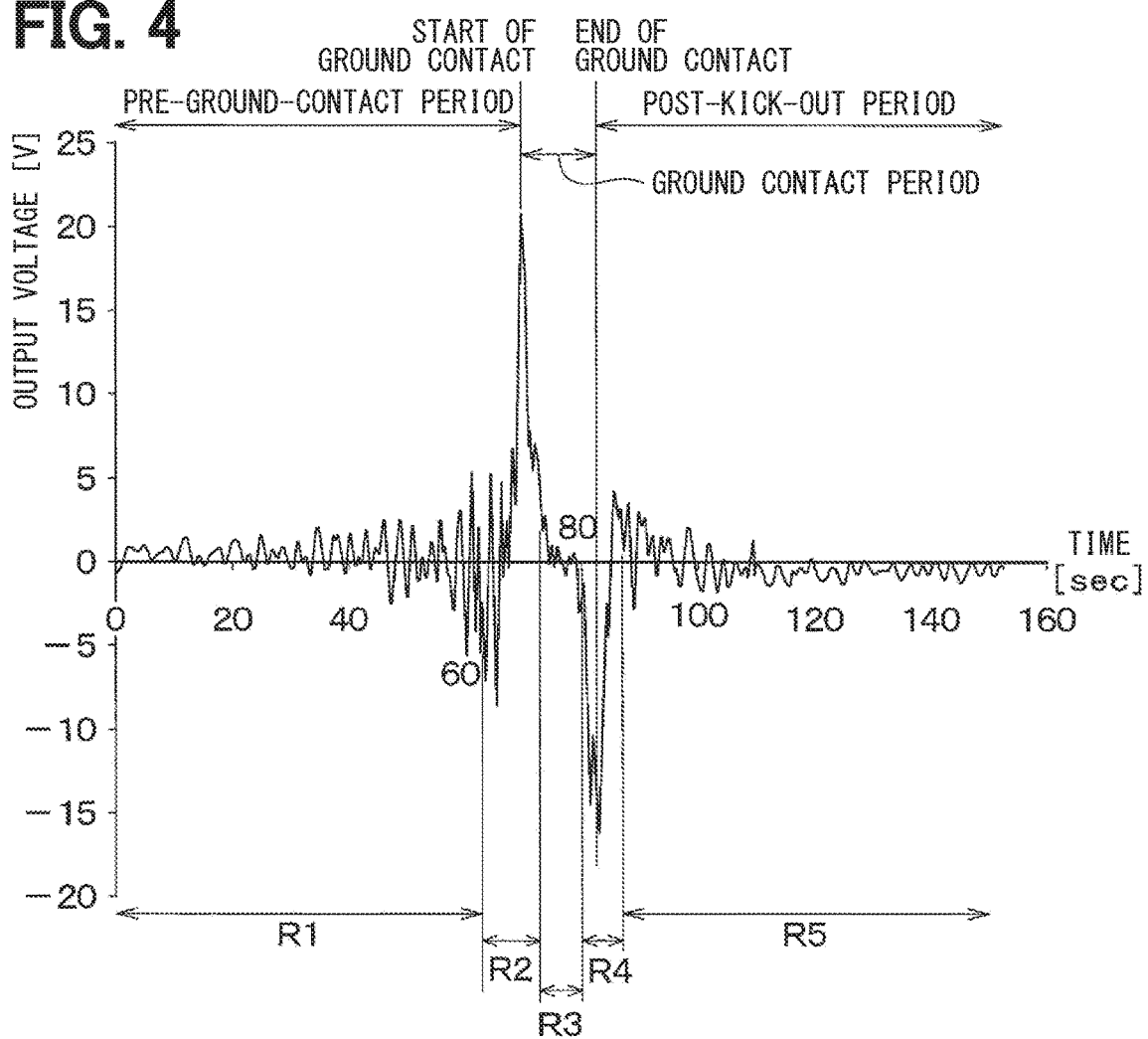
FIG. 4 is a diagram illustrating an output voltage waveform from an acceleration acquisition unit during tire rotation.

The output voltage waveform of the detection signal from the vibration sensor unit 10 during tire rotation is, e.g., the waveform illustrated in FIG. 4. As illustrated in FIG. 4, at a ground contact start time when a portion (hereinafter referred to as a device mounting position) of the tread 31 corresponding to a place where the vibration sensor unit 10 is disposed starts to come into contact with the ground with the rotation of the tire 3, the output voltage from the vibration sensor unit 10 has a maximum value. A peak value at the ground contact start time when the output voltage from the vibration sensor unit 10 has the maximum value is hereinafter referred to as a first peak value. As also illustrated in FIG. 4, at a ground contact end time when the device mounting position, which has been in contact with the ground, comes out of contact with the ground with the rotation of the tire 3, the output voltage from the vibration sensor unit 10 has a minimum value. A peak value at the ground contact end time when the output voltage from the vibration sensor unit 10 has the minimum value is hereinafter referred to as a second peak value.

The following is the reason why the output voltage from the vibration sensor unit 10 has the peak values at the time points described above. That is, when the device mounting position comes into contact with the ground with the rotation of the tire 3, a portion of the tire 3 which has been a generally cylindrical surface in the vicinity of the vibration sensor unit 10 receives a pressure to be deformed into a planar shape. At this time, the vibration sensor unit 10 receives an impact, and consequently the output voltage from the vibration sensor unit 10 has the first peak value. On the other hand, when the device mounting position comes out of contact with the ground contact surface with the rotation of the tire 3, the tire 3 is released from the pressure in the vicinity of the vibration sensor unit 10 and returned from the planar shape to a generally cylindrical shape. The vibration sensor unit 10 receives an impact when the tire 3 is returned to the original shape, and consequently the output voltage from the vibration sensor unit 10 has the second peak value. Thus, the output voltage from the vibration sensor unit 10 has the first and second peak values at the ground contact start time and the ground contact end time. In addition, since the direction of the impact when the tire 3 receives the pressure is opposite to the direction of the impact when the tire 3 is released from the pressure, signs of the output voltages are also opposite to each other.

A moment when the device mounting position comes into contact with the ground at the road surface is assumed to fall within a "step-on period", while a moment when the device mounting position leaves the road surface is assumed to fall within a "kick-out period". The "step-on period" includes the time point at which the first peak value is reached, while the "kick-out period" includes the time point at which the second peak value is reached. It is also assumed that a period before the "step-on period" is a "pre-step-on period", a period between the step-on period and the kick-out period, i.e., a period where the device mounting position is in contact with the ground is a "pre-kick-out period", and a period after the kick-out period is a "post-kick-out period". Thus, a period during which the device mounting position is in contact with the ground and periods before and after the period can be segmented into the five periods. Note that, in FIG. 4, the "pre-step-on period", the "step-on period", the "pre-kick-out period", the "kick-out period", and the "post-kick-out period" of the detection signal are successively shown as five periods R1 to R5.

Depending on the road surface state, vibration occurred in the tire 3 varies from one of the periods resulting from the segmentation to another, and the detection signal from the vibration sensor unit 10 varies from one of the periods to another. Accordingly, by subjecting the detection signal from the vibration sensor unit 10 in each of the periods to frequency analysis, the road surface state of the road surface traveled by the vehicle is detected. For example, in a slippery road surface state such as that of a hard-compacted snow road, a sheering force at a kick-out time deteriorates, and consequently a band value selected in a 1 kHz to 4 kHz band decreases in the kick-out period R4 and the post-kick-out period R5. Thus, each of frequency components of the detection signal from the vibration sensor unit 10 varies depending on the road surface state, and therefore it is possible to determine the road surface state based on the frequency analysis of the detection signal.

Figure 5:
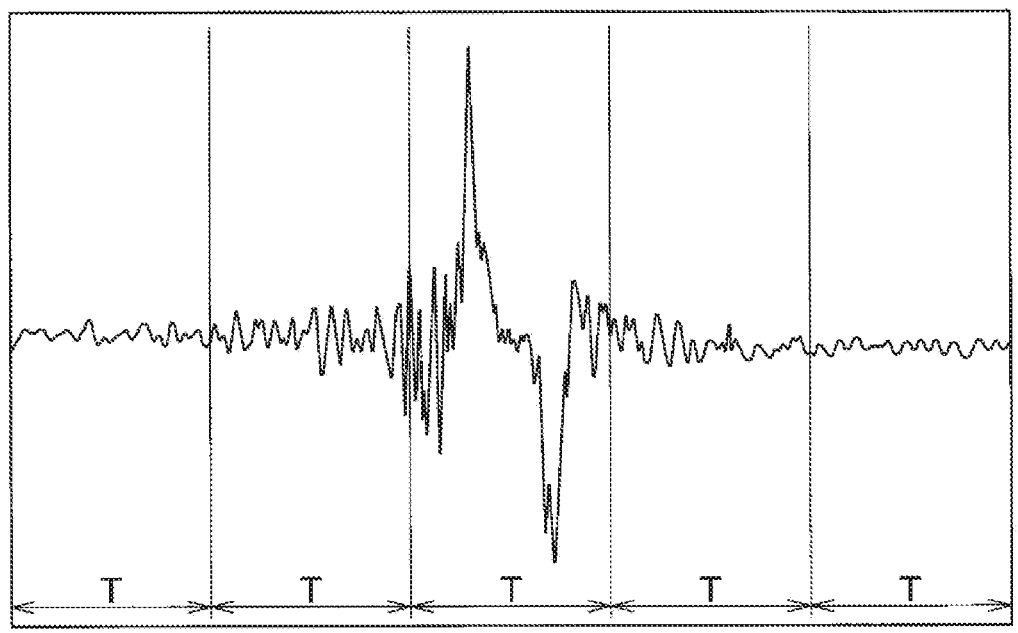
FIG. 5 is a diagram illustrating a detection signal from the acceleration acquisition unit, which is segmented by each of time windows having a predetermined time width T.

Accordingly, the waveform processing unit 11a segments, by each of time windows having a predetermined time width T, the detection signal from the vibration sensor unit 10 corresponding to one rotation of the tire 3 which exhibits a continuous time axis waveform into the plurality of segments as illustrated in FIG. 5, and performs the frequency analysis in each of the segments to extract the feature quantities. Specifically, by performing the frequency analysis in each of the segments, the waveform processing unit 11a determines a power spectral value in each of the frequency bands, i.e., a vibration level in a specified frequency band, and uses the power spectral values as the feature quantities.

Note that the number of the segments resulting from the segmentation performed using the time window having the time width T is a value which varies depending on a vehicle speed, more specifically the rotating speed of the tire 3. For example, the time width T can be set to a given time period, e.g., 3 msec or can be varied depending on the vehicle speed. Also, in a case described herein, each of the time widths T is set such that the consecutive adjacent time widths T do not overlap each other, but each of the time widths T may also be set such that the consecutive adjacent time widths T partially overlap each other. In the following description, the number of the segments corresponding to one rotation of the tire is assumed to be n (where n is a natural number).

For example, the power spectral value obtained by causing the detection signal in each of the segments to pass through filters in a plurality of specified frequency bands, e.g., five bandpass filters in, e.g., a 0 to 1 kHz frequency band, a 1 to 2 kHz frequency band, a 2 to 3 kHz frequency band, a 3 to 4 kHz frequency band, and a 4 to 5 kHz frequency band is used as the feature quantity. The feature quantity is referred to as the feature vector. When each of the power spectral values in the individual specified frequency bands is represented by $a_{ik}$, a feature vector $Xi$ of a given segment i (where i is a natural number satisfying $1 \le i \le n$) is given as a matrix having the power spectral values $a_{ik}$ as elements by the following expression.

$$x_i = \begin{bmatrix} a_{i1} \\ a_{i2} \\ a_{i3} \\ a_{i4} \\ a_{i5} \end{bmatrix} \quad \text{(Expression 1)}$$

Note that k in each of the power spectral values $a_{ik}$ is the number of the specified frequency bands, i.e., the number of the bandpass filters. When the 0 to 5 kHz band is segmented into the five periods as described above, k=1 to 5 is satisfied. A determinant X collectively showing feature vectors X1 to Xn of all the segments 1 to n is given by the following expression.

$$x = \begin{bmatrix} a_{11} & a_{21} & \dots & a_{n1} \\ a_{12} & a_{22} & \dots & a_{n2} \\ a_{13} & a_{23} & \dots & a_{n3} \\ a_{14} & a_{24} & \dots & a_{n4} \\ a_{15} & a_{25} & \dots & a_{n5} \end{bmatrix} \quad \text{(Expression 2)}$$

The determinant X serves as an expression indicative of the feature quantities corresponding to one tire rotation. The control unit 11 performs frequency analysis of the detection signal from the vibration sensor unit 10 to extract the feature quantities represented by the determinant X.

Next, a description will be given of a method of determining the road surface state using the support vectors.

As described above, the determination of the road surface state is performed by comparing the feature quantities included in the road surface data transmitted from the tire-side device 1 to the support vectors stored for each type of the road surface in the support vector storage unit 25. For example, it is possible to determine the degrees of similarity of the feature quantities to all the support vectors stored for each type of the road surface and determine that the road surface corresponding to the support vectors having the highest degree of similarity is the currently traveled road surface.

For example, the calculation of the degrees of similarity of the feature quantities to all the support vectors stored for each type of the road surface can be performed by a method as described below.

As described above, it is assumed with respect to the determinant X indicative of the feature quantities that a determinant indicative of the feature quantities is X(r), a determinant indicative of the support vectors is X(s), and the power spectral values $a_{ik}$ serving as respective elements of the determinants are represented by $a(r)_{ik}$ and $a(s)_{ik}$. In that case, the determinant X(r) indicative of the feature quantities and the determinant X(s) indicative of the support vectors are represented as follows.

$$x(r) = \begin{bmatrix} a(r)_{11} & a(r)_{21} & \dots & a(r)_{n1} \\ a(r)_{12} & a(r)_{22} & \dots & a(r)_{n2} \\ a(r)_{13} & a(r)_{23} & \dots & a(r)_{n3} \\ a(r)_{14} & a(r)_{24} & \dots & a(r)_{n4} \\ a(r)_{15} & a(r)_{25} & \dots & a(r)_{n5} \end{bmatrix} \quad \text{(Expression 3)}$$

-continued $$x(s) = \begin{bmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{bmatrix}$$ (Expression 4)

The degree of similarity represents a degree to which the feature quantities and the support vectors which are represented by the two determinants are similar to each other, and indicates that, as the degree of similarity is higher, the feature quantities and the support vectors are more similar to each other. In the first embodiment, the road surface determination unit 26 determines the degree of similarity using a kernel method, and determines the road surface state based on the degree of similarity. The road surface determination unit 26 calculates herein an inner product of the determinant X(r) indicative of the feature quantities and the determinant X(s) indicative of the support vectors, i.e., a distance between respective coordinates represented by the respective feature vectors Xi of the individual segments resulting from the segmentation using each of the time windows having the predetermined time width T in a feature space, and uses the inner product as the degree of similarity.

Figure 6:
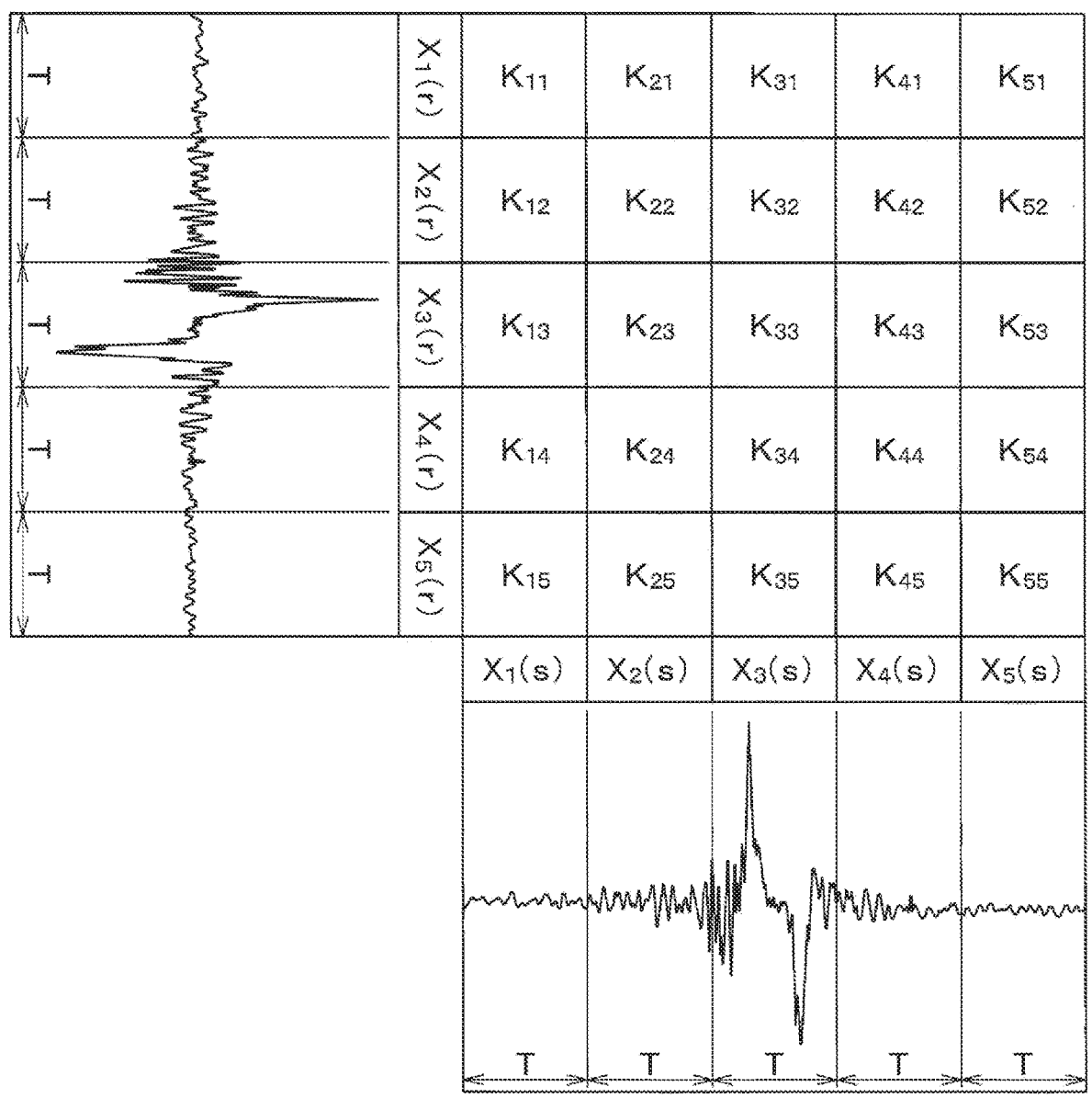
FIG. 6 is a diagram illustrating relationships between determinants Xi(r) and Xi(s) and a distance $K_{yz}$ in each of segments resulting from segmentation of a time axis waveform during a most recent rotation of the tire and a time axis waveform during an immediately previous rotation of the tire by each of the time windows having the predetermined time width T.

For example, as illustrated in FIG. 6, as the time axis waveform of the detection signal from the vibration sensor unit 10, each of the time axis waveform during the most recent rotation of the tire 3 and the time axis waveform of the support vectors is segmented into individual segments by the time window having the predetermined time width T. In the case of the illustrated example, each of the time axis waveforms is segmented into the five segments, and accordingly n=5 is satisfied, and i is given by 1≤i≤5. It is assumed herein that, as illustrated in the drawing, the feature vectors Xi of the individual segments during the most recent rotation of the tire 3 are Xi(r), and the feature vectors of the individual segments of the support vectors are Xi(s). In that case, distances $K_{yz}$ between the coordinates represented by the feature vectors Xi of the individual segments are represented as in cells where cells containing the feature vectors Xi(r) of the individual segments during the most recent rotation of the tire 3, which are arranged laterally to cells containing the distances $K_{yz}$, and cells containing the feature vectors Xi(s) of the individual segments of the support vectors, which are arranged vertically to the cells containing the distances $K_{yz}$, cross each other. Note that, in each of the distances $K_{yz}$, y corresponds to i in Xi(s), while z corresponds to i in Xi(r). Actually, depending on the vehicle speed, the number of the segments during the most recent rotation of the tire 3 may be different from the number of the segments of the support vectors. However, a case where the number of the segments during the most recent rotation of the tire 3 is the same as the number of the segments of the support vectors is shown by way of example.

In the first embodiment, the feature vectors are acquired by segmenting each of the time axis waveforms into the five specified frequency bands. Consequently, the feature vectors Xi of the individual segments are represented in a six-dimensional space including the time axis, and the distances between the coordinates represented by the feature vectors Xi of the individual segments correspond to distances between the coordinates in the six-dimensional space. However, since the distances between the coordinates represented by the feature vectors of the individual segments are smaller as the feature quantities and the support vectors are more similar to each other and larger as the feature quantities and the support vectors are less similar to each other, smaller distances represent higher degrees of similarity, while larger distances represent lower degrees of similarity.

For example, when segments 1 to n are provided by time division, each of the distances $K_{yz}$ between the coordinates represented by the feature vectors of the individual segments 1 is given by the following expression.

$$K_{yz} = \sqrt{\{a(r)_{11}-a(s)_{11}\}^2 + \{a(r)_{12}-a(s)_{12}\}^2 + \ldots \{a(r)_{15}-a(s)_{15}\}^2}$$
(Expression 5)

Thus, the distances $K_{yz}$ between the coordinates represented by the feature vectors of the individual segments obtained by time division are determined for all the segments, a total sum $K_{total}$ of the distances $K_{yz}$ for all the segments is arithmetically determined, and the total sum $K_{total}$ is used as a value corresponding to the degree of similarity. Then, the total sum $K_{total}$ is compared to a predetermined threshold Th and, when the total sum $K_{total}$ is larger than the threshold Th, it is determined that the degree of similarity is low. When the total sum $K_{total}$ is smaller than the threshold Th, it is determined that the degree of similarity is high. Such calculation of the degrees of similarity is performed with respect to all the support vectors, and it is determined that the type of the road surface corresponding to the support vectors having the highest degree of similarity is the currently traveled road surface state. Thus, the road surface state can be determined.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of the segments, can be used or a least-square method can be used. It is also possible to determine the degree of similarity using various kernel functions.

In the case described herein, the calculation of the degree of similarity of the feature quantities to the support vectors is performed using all the feature quantities obtained from the detection signal from the vibration sensor unit 10 of the tire-side device 1 corresponding to one tire rotation. However, in the first embodiment, as described above, the data selection unit 11b selects the data items indicative of the feature quantities to be included in the road surface data, and there may be a case where the data selection unit 11b transmits, to the road surface determination unit 26, a part of the feature quantities corresponding to one tire rotation. In that case, the calculation of the degree of similarity is performed using the feature quantities during one tire rotation, which are included in the road surface data, and those of the support vectors corresponding to the feature quantities included in the road surface data. A description will be given below of a method of the data selection in the data selection unit 11b and of a method of calculating the degree of similarity based on the selected feature quantities.

First, a description will be given of the method of the data selection. The data selection is performed by selecting the feature quantity having particularly high feature degree indicative of the road surface state from the feature quantities corresponding to one tire rotation which are obtained from the detection signal from the vibration sensor unit 10.

In the first embodiment, the feature quantity having the highest feature degree is selected from the selected feature quantities.

The feature degree indicates a rate at which differences between the feature quantities for one type of the road surface and the feature quantities for another type of the road surface increase. As the feature degree is higher, larger differences are observed between the respective feature quantities for the different types of the road surface states. Accordingly, by determining the road surface state using the feature quantities having high feature degree, it is possible to determine the road surface state even when an amount of data is small.

For example, the feature degree is higher in a specified period during one tire rotation. As described above, the waveform of the output voltage of the detection signal from the vibration sensor unit 10 corresponding to one tire rotation is as illustrated in FIG. 4. For example, in the period R2, large differences are observed between the feature quantity for a wet road and the feature quantity for another type of road surface such as a dry road. This is because, on the wet road, an amount of slip occurring immediately before the device mounting position comes into contact with the ground at the road surface is larger than that on another road surface. Meanwhile, in the period R3, large differences are observed between the feature quantity for the frozen road and the feature quantity for another type of road surface such as a dry road. This is because, on the frozen road, the device mounting position is most significantly affected by vibration resulting from a slip on the road surface while the device mounting position is in contact with the ground. Thus, depending on the type of the road surface, the feature degree is higher in a specified period during one tire rotation.

Note that the specified period mentioned herein typically corresponds to any of the periods R1 to R5, but may also be a portion of any of the periods R1 to R5 such as a portion of the period R1 closer to the period R2 or, alternatively, the specified period may be included in a plurality of periods such as the periods R2 and R3. Since the specified period can be recognized as one of the individual segments resulting from the segmentation of the detection signal by the time width T or as the plurality of segments, the specified period is synonymous to the detection signal at a predetermined time point during one tire rotation or the detection signal during a predetermined period.

The feature degree is also higher in a specified frequency band. For example, when there is sand, gravel, or the like on the road surface, vibration resulting from roughness due to the sand, gravel, or the like appears in the detection signal from the vibration sensor unit 10. However, the vibration component may not directly represent the road surface state. Since it is recognized that the vibration component appears in a frequency band of, e.g., several hundreds of hertz, the feature quantity corresponding to the road surface state actually intended to be determined is obtained in a frequency band different from the frequency band mentioned above, resulting in a higher feature degree.

Thus, it is possible to, e.g., select, from the feature quantities obtained from the detection signal from the vibration sensor unit 10 corresponding to one tire rotation, select the feature quantity in the specified period, or select the feature quantity in the specified frequency band. In addition, it is also possible to select, from the feature quantities obtained from the detection signal from the vibration sensor unit 10 corresponding to one tire rotation, the feature quantity in the specified period and in the specified frequency band.

For example, from the feature quantities obtained from the detection signal from the vibration sensor unit 10 corresponding to one tire rotation, the feature quantities in the period R2 or the period R3 are selected. Specifically, when the feature quantities in the period R2 are to be selected, as illustrated in FIG. 10, the feature quantities in a dot-dash-line frame C1 in the expression are selected. Alternatively, the feature quantities in a frequency band of 1 kHz or more except for a frequency band of several hundreds of hertz are selected from the feature quantities obtained from the detection signal from the vibration sensor unit 10 corresponding to one tire rotation. For example, a frequency band of 1 to 2 kHz can be selected and, in that case, as illustrated in FIG. 11, the feature quantities in a dot-dash-line frame C2 in the expression are selected. When the feature quantities in the period R2 and in the frequency band of 1 to 2 kHz are to be selected, as illustrated in FIG. 12, the feature quantity in a dot-dash-line frame C3 in the expression are selected.

Thus, the data selection is performed. Note that a period or a frequency band the feature quantities of which are to be selected by the data selection may differ depending on the specifications of the vehicle, the type of the tire 3, or the like. Accordingly, it is appropriate to determine the feature degree based on experiment or the like and perform the data selection using a period or a frequency band in which the feature degree is particularly high.

Subsequently, a description will be given of a method of calculating the degree of similarity based on the selected one of the feature quantities. In the tire-side device 1, when one of the feature quantities during one tire rotation is selected, the road surface data including the feature quantity is transmitted to the road surface determination unit 26. Based on the road surface data, the road surface determination unit 26 calculates the degree of similarity using the feature quantity during one tire rotation included in the road surface data and the support vector corresponding to the feature quantity included in the road surface data.

Figure 7:
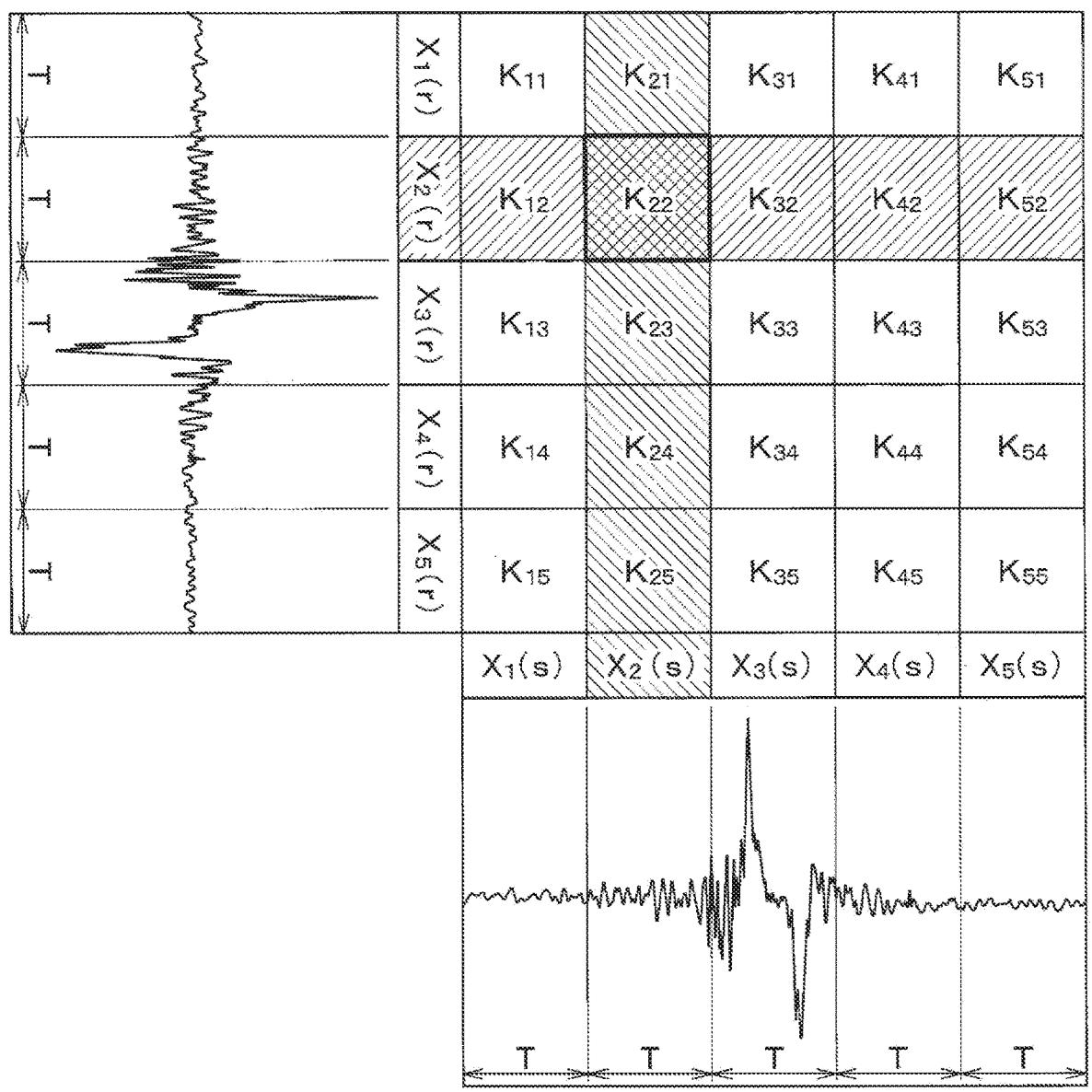
FIG. 7 is a diagram illustrating the relationships between the determinants Xi(r) and Xi(s) and the distance $K_{yz}$ and illustrating a method of calculating a degree of similarity when feature quantities in a period R2 are selected.

For example, when the feature quantities in the period R2 are selected, as illustrated in FIG. 11, from all the support vectors stored for each type of the road surface, those corresponding to the period R2 are extracted. Then, the degree of similarity of the feature quantities in the period R2 to those of all the support vectors stored for each type of the road surface which correspond to the period R2 is calculated. In the example illustrated in FIG. 5, Segment 2 corresponds to the period R2, and therefore the degree of similarity of feature vectors $X_2(r)$ in Segment 2 resulting from time-division multiplexing to feature vectors $X_2(s)$ extracted from the support vectors and corresponding to Segment 2 is calculated as illustrated in FIG. 7. In this case, a distance $K_{22}$ between coordinates represented by the feature vectors each in Segment 2 has a value corresponding to the degree of similarity. Thus, the degree of similarity is calculated based on the selected ones of the feature vectors.

Note that the description has been given heretofore of the method of calculating the degree of similarity when feature quantities in a specified period are selected by data selection. However, the method of calculating the degree of similarity is the same even when feature quantities in a specified frequency band are selected or when feature quantities in a specified period and in a specified frequency band are selected. For example, by extracting feature quantities in the frame C2 in FIG. 11, extracting, from all the support vectors stored for each type of the road surface, those corresponding to the frame C2, and determining distances between the extracted feature quantities and the extracted support vectors, it is possible to obtain a value corresponding to the degree of similarity.

Subsequently, a description will be given of an operation of the tire system 100 according to the first embodiment with reference to FIGS. 8 and 9.

Figure 8:
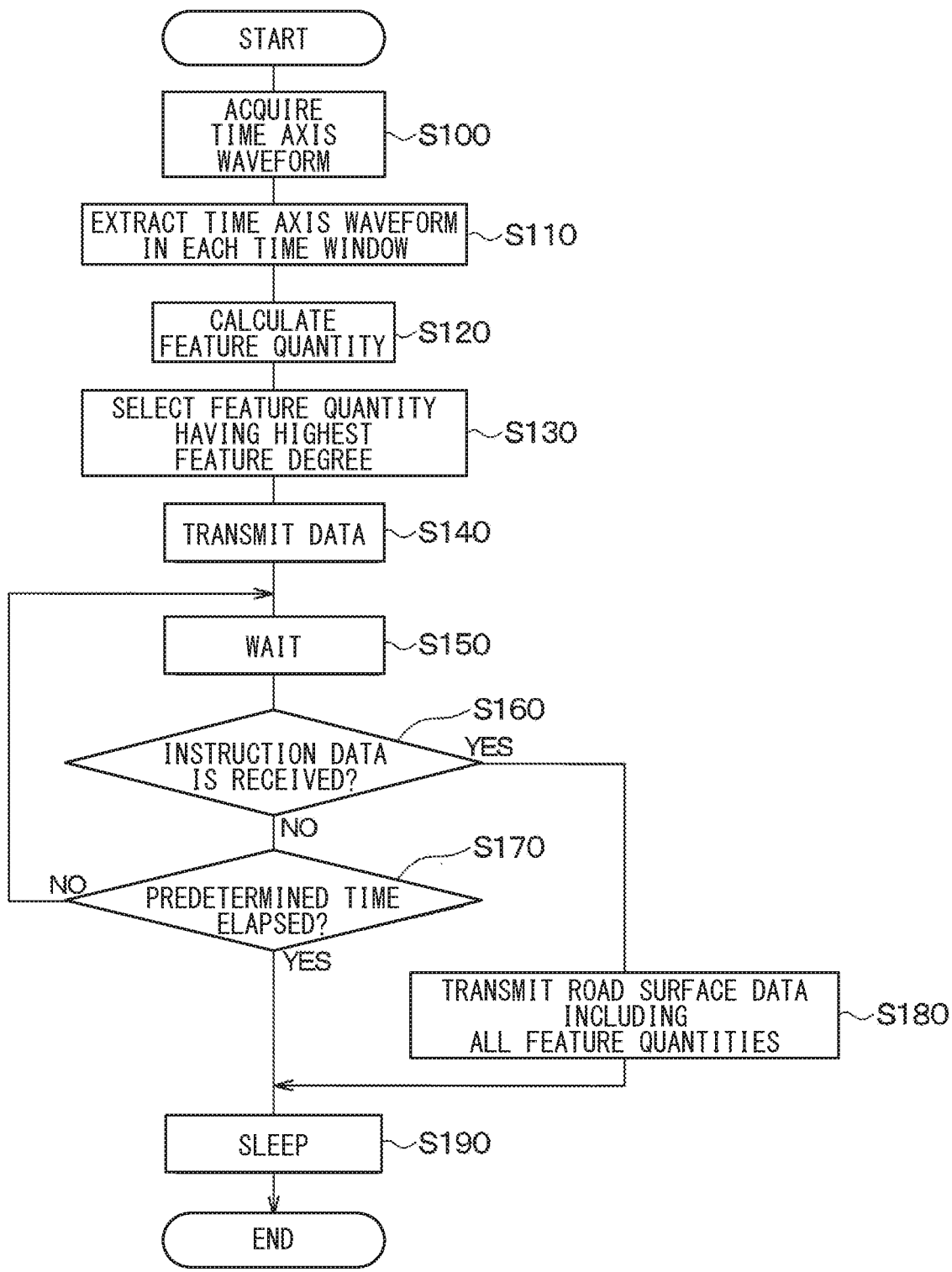
FIG. 8 is a flow chart of a data transmission process performed by a control unit of the tire-side device.

In the tire-side device 1, the control unit 11 is in a sleep state at time other than time point of transmitting the road surface data, but is automatically switched to a wakeup state at each time point of transmitting the road surface data to perform a data transmission process illustrated in FIG. 8.

First, in S100, the control unit 11 causes the waveform processing unit 11a to acquire the time axis waveform of the detection signal from the vibration sensor unit 10 corresponding to one tire rotation. Then, the control unit 11 advances to S110 and segments, by each of the time windows having the predetermined time width T, the detection signal having the acquired time axis waveform into a plurality of segments. Then, the control unit 11 advances to S120 and performs frequency analysis in each of the segments resulting from the segmentation in S110 to obtain a power spectral value in each of the frequency bands and thus calculate the feature quantities corresponding to one tire rotation.

Subsequently, the control unit 11 advances to S130 and causes the data selection unit 11b to select the feature quantity having a highest feature degree from the feature quantities corresponding to one tire rotation that have been calculated in S120. For example, as described above, the feature quantities in a specified period or in a specified frequency band are selected or the feature quantity in a specified period and at specified frequencies is selected. Then, the control unit 11 advances to S140 and causes the data selection unit 11b to transmit the road surface data including the selected feature quantity to the data communication unit 12. As a result, the road surface data including the selected feature quantity is transmitted to the vehicle-body-side system 2 through the data communication unit 12.

Figure 9:
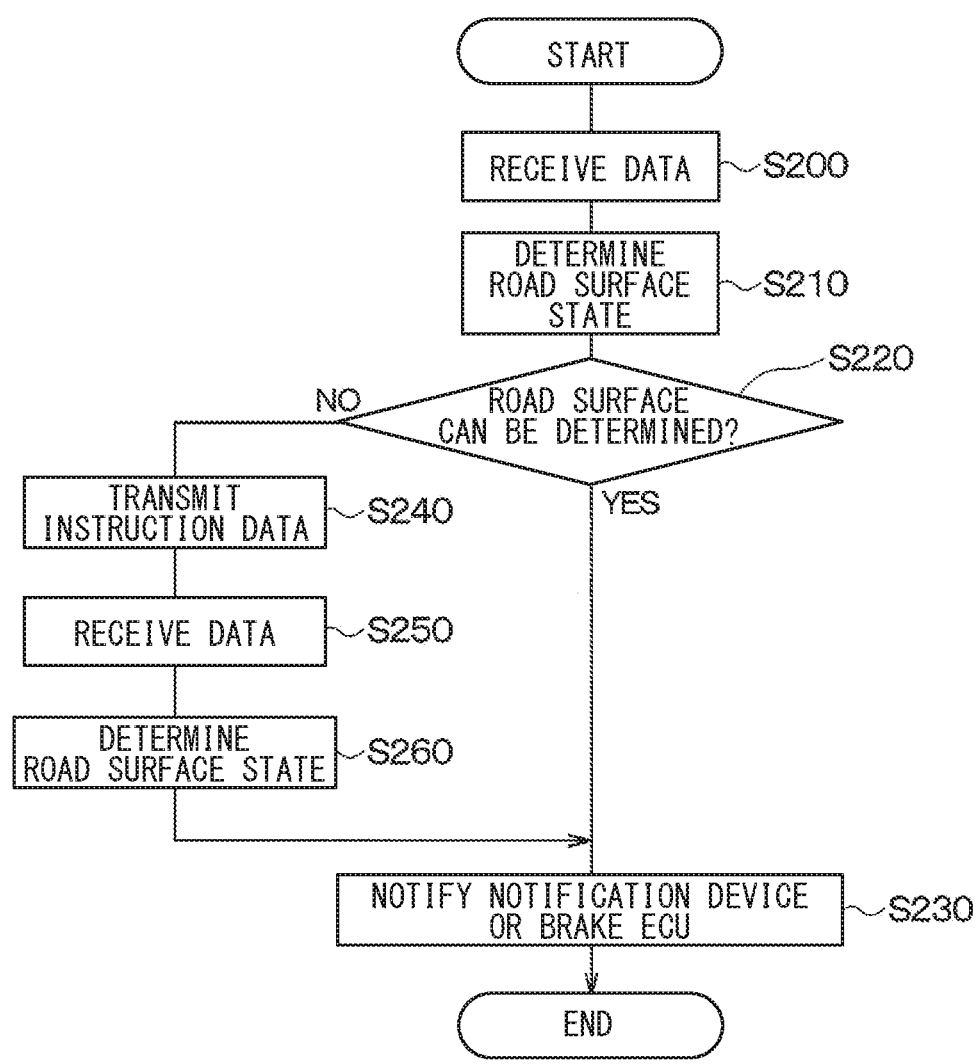
FIG. 9 is a flow chart of a road surface state determination process performed by a road surface determination unit of the vehicle-body-side system.

Meanwhile, in the vehicle-body-side system 2, when an activation switch such as an ignition switch not shown is turned ON, the road surface determination unit 26 performs a road surface state determination process illustrated in FIG. 9 in each predetermined control cycle. This process is performed every time the road surface data is transmitted from the tire-side device 1.

First, in S200, the road surface determination unit 26 performs a data reception process. This process is performed by the road surface determination unit 26 by receiving the road surface data transmitted from the tire-side device 1 through the data communication unit 24. When the road surface data is transmitted from the tire-side device 1 in S140 in FIG. 8, the road surface data is received by the data communication unit 24.

Subsequently, the road surface determination unit 26 advances to S210 and determines the road surface state. The determination of the road surface state is performed using the method of calculating the degree of similarity based on the selected one of the feature quantities, as described above. Then, the road surface determination unit 26 advances to S220 and determines whether or not the road surface state can be determined. Specifically, when the road surface state is determined using the method of calculating the degree of similarity based on the selected one of the feature quantities, it is highly probable that the road surface state can be determined, but it is not necessarily possible to determine the road surface data in any situation. For example, the road surface state of the road surface currently traveled by the vehicle shifts from a dry road to a wet road or from the wet road to a frozen road, but may shift gradually, not suddenly. While the road surface state is shifting, the road surface state may not be able to be clearly determined.

Accordingly, when the road surface state can be determined, the road surface determination unit 26 advances to S230, transmits a result of the determination of the road surface state to the notification device 23 or to the brake ECU22, and ends the process. When the road surface state has not been determined, the road surface determination unit 26 advances to S240. Then, in S240, the road surface determination unit 26 causes the data communication unit 24 to transmit instruction data requesting the tire-side device 1 that has transmitted the road surface data to transmit more detailed road surface data.

Meanwhile, after transmitting the road surface data including some of the feature quantities during one tire rotation, each of the tire-side devices 1 advances to S150 and is brought into a data wait state. Specifically, when the road surface determination unit 26 cannot determine the road surface state as described above, the instruction data is transmitted in S240 in FIG. 9. Consequently, each of the tire-side devices 1 is brought into the wait state for the instruction data which may be transmitted to the tire-side device 1. The data wait state is sustained until a predetermined time period elapses in S170. When the instruction data is received during the lapse of the predetermined time period, the tire-side device 1 advances to S180. Then, to allow determination of the road surface state based on the more detailed road surface data to be made, the tire-side device 1 performs a process of transmitting the road surface data including all the feature quantities corresponding to one tire rotation. As a result, the road surface data including all the feature quantities corresponding to one tire rotation is transmitted through the data communication unit 12. When the instruction data is not delivered even after a lapse of the predetermined time period in S170 or when the transmission of the more detailed road surface data is performed in S180, the tire-side device 1 advances to S190, the road surface determination unit 26 is brought into the sleep state, and the process is ended.

The road surface data including all the feature quantities corresponding to one tire rotation is transmitted herein but, since at least one of the feature quantities having a high feature degree is already transmitted to the road surface determination unit 26, it may also be possible to allow the road surface data including the other feature quantities to be transmitted. This can reduce a time period required for the transmission of the road surface data.

Meanwhile, after the instruction data is transmitted from the vehicle-body-side system 2 in S240, the more detailed road surface data is transmitted from the tire-side device 1 to the vehicle-body-side system 2. Therefore, the vehicle-body-side system 2 advances to S250 and performs a data reception process. Then, on receiving the more detailed road surface data, the road surface determination unit 26 determines the road surface state based on the more detailed road surface data in S260. Specifically, the road surface determination unit 26 determines the degrees of similarity of the feature quantities corresponding to one tire rotation to all the support vectors and determines the road surface corresponding to the support vectors having the highest degree of similarity to be a currently traveled road surface. When thus determining the road surface state, the road surface determination unit 26 advances to S230, transmits a result of the determination to the notification device 23 or to the brake ECU 22, and ends the process.

As described above, with the tire system 100 according to the first embodiment, it is possible to determine the road surface state of the road surface traveled by the vehicle. Normally, the vehicle-body-side system 2 causes each of the tire-side devices 1 to transmit the road surface data including at least one of the feature quantities during one tire rotation to the vehicle-body-side system 2 and determines the road surface state based on the road surface data. This can reduce a transmission time period when the tire-side device 1 performs data transmission. As a result, it is possible to perform the determination of the road surface state with good responsiveness and perform highly responsive vehicle movement control. In addition, it is also possible to reduce power consumption due to the data transmission and achieve an improved battery life or the like.

Normally, the road surface state is constant over a long period of time, and the probability of a change in the road surface state is lower than the probability of a constant road surface state over a long period of time. In the respective road surface states of a dry road surface, a set road surface, a snow-covered road surface, a frozen road surface, and the like, the features of the tire G are distinctly different, and it is highly probable that the road surface state can be determined based on the road surface data including some of the feature quantities during one tire rotation. As a result, it is highly probable to achieve the effect of allowing a reduction in the time period required for the transmission of the road surface data and a reduction in power consumption during the driving of the vehicle.

In addition, when the road surface state cannot be determined based on the road surface data including some of the feature quantities during one tire rotation, the vehicle-body-side system 2 transmits the instruction data to the tire-side device 1 based on the bidirectional communication. Consequently, when the road surface state gradually shifts, the vehicle-body-side system 2 transmits the instruction data to the tire-side device 1. This allows the tire-side device 1 to transmit the more detailed road surface data and allows the road surface determination unit 26 to more reliably determine the road surface state.

Other Embodiments

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

(1) For example, in the embodiment described above, in S180 in FIG. 8, the road surface data including all the feature quantities corresponding to one tire rotation is transmitted. However, the road surface data including all the feature quantities corresponding to one tire rotation in not necessarily be transmitted from the very beginning. For example, at normal times, the tire-side device 1 is caused to transmit the road surface data including the feature quantity having a highest feature degree and, when the road surface determination unit 26 cannot determine the road surface state yet, the tire-side device 1 is caused to transmit the road surface data including the feature quantity having a second highest feature degree. When the road surface determination unit 26 cannot determine the road surface state yet, it is possible to cause the tire-side device 1 to transmit the road surface data including all the feature quantities corresponding to one rotation. In other words, the tire-side device 1 transmits the road surface data including at least one of the feature quantities different from that already transmitted as the feature quantity included in the road surface data and, when the road surface state cannot be determined yet, the tire-side device 1 further transmits the road surface data including at least one of the different feature quantities. Thus, it may also be possible to stepwise change the feature quantity to be transmitted and thus determine the road surface state.

(2) In addition, the data selection is made by specifying conditions for the feature quantity to be selected from the feature quantities corresponding to one tire rotation. For example, the feature quantity in a specified period is selected or the feature quantity in a specified frequency band is selected. It may also be possible to vary the conditions based on the instruction data from the vehicle-body-side system 2. For example, it may also be possible for the vehicle-body-side system 2 to give an instruction to select the feature quantity in the specified period using the instruction data or give an instruction to select the feature quantity at specified frequencies using the instruction data.

For example, in such a case where a wet road continues, to allow a change in the road surface state of the wet road surface to be clearly recognized, it is preferred to determine the road surface state based on the road surface data including the feature quantities in the period R2. Likewise, in such a case where a frozen road continues, to allow a change in the road surface state of the frozen road to be clearly recognized, it is preferred to determine the road surface state based on the road surface data including the feature quantities in, e.g., a 1 to 2 kHz band. Accordingly, when the road surface has a specified road surface state, the vehicle-body-side system 2 can also give, to the tire-side device 1, an instruction to transmit the road surface data including the feature quantity having a high feature degree in the road surface state using the instruction data.

(3) In the embodiment described above, the case where the vibration sensor unit 10 is provided by the acceleration sensor is shown by way of example. However, the vibration sensor unit 10 can also be provided by another element capable of detecting vibration such as, e.g., a piezoelectric element.

(4) Also, in the embodiment described above, as the road surface data indicative of the road surface state appearing in the detection signal from the vibration sensor unit 10 of the tire-side device 1, the data including the feature quantities is used. However, this is an exemplary, and another data may also be used as the road surface data. For example, integral value data of individual vibration waveforms in the five periods R1 to R5 included in vibration data during one rotation of the tire 3 may also be used as the road surface data or, alternatively, raw data represented by the detection signal may also be used as the road surface data.

(5) Also, in the embodiment described above, the road surface determination unit 26 of the receiver 21 included in the vehicle-body-side system 2 determines the degree of similarity of the feature quantities to the support vectors to determine the road surface state.

However, this is an exemplary, and it may also be possible that another ECU at any place in the vehicle-body-side system 2, such as, e.g., the brake ECU 22, determines the degree of similarity, determines the road surface state, and transmits an instruction signal. Alternatively, it may also be possible to store the support vectors in each of the tire-side devices 1 and allow the tire-side device 1 to determine the road surface state and transmit data indicative of a result of the determination of the road surface state as the road surface data to the vehicle-body-side system 2.

What is claimed is:

1. A road surface state determination device comprising:
a tire-side device attached to each of a plurality of tires included in a vehicle; and
a vehicle-body-side system included in a body of the vehicle, wherein
the tire-side device includes
a vibration detection unit configured to output a detection signal corresponding to a magnitude of vibration applied to the tire,
a control unit that includes a waveform processing unit configured to extract data items of a road surface state indicative of the vibration of the tire during one rotation of the tire from the detection signal and a data selection unit configured to select a partial data item having a higher feature degree for the road surface state from the data items and generate road surface data including the partial data item during one rotation of the tire, and
a first data communication unit configured to transmit the road surface data, and
the vehicle-body-side system includes
a second data communication unit configured to receive the road surface data transmitted from the first data communication unit, and
a road surface determination unit configured to determine the road surface state based on the partial data item included in the road surface data.

2. The road surface state determination device according to claim 1, wherein:
the first data communication unit and the second data communication unit perform bidirectional communication with each other; and
when the road surface determination unit is incapable of determining the road surface state based on the partial data item included in the road surface data, the vehicle-body-side system transmits instruction data that causes the tire-side device to transmit the road surface data that is included in the data items and different from the partial data item.

3. The road surface state determination device according to claim 2, wherein
the vehicle-body-side system transmits the instruction data that causes the tire-side device to transmit, as the road surface data, all of the data items except for the partial data item.

4. The road surface state determination device according to claim 1, wherein:
the waveform processing unit extracts feature quantities of the vibration of the tire from the detection signal as the data items;

the data selection unit selects a feature quantity having a higher feature degree for the road surface state from the feature quantities; and
the road surface determination unit determines the road surface state based on the feature quantity included in the road surface data.

5. The road surface state determination device according to claim 4, wherein:
the waveform processing unit divides a time axis waveform of the detection signal by a predetermined time width and extracts the feature quantities, from the time axis waveform, each corresponding to one of a section of the time axis waveform divided by the predetermined time width; and
the data selection unit selects the feature quantity having the higher feature degree for the road surface state from the feature quantities and transmits the road surface data to the vehicle-body-side system through the first data communication unit.

6. The road surface state determination device according to claim 4, wherein
the data selection unit selects a feature quantity in a specified period of the detection signal during one rotation of the tire as the feature quantity having the higher feature degree.

7. The road surface state determination device according to claim 4, wherein
the data selection unit selects a feature quantity in a specified frequency band of the detection signal during one rotation of the tire as the feature quantity having the higher feature degree.

8. The road surface state determination device according to claim 4, wherein
the data selection unit selects a feature quantity in a specified period of the detection signal during one rotation of the tire and in a specified frequency band of the detection signal as the feature quantity having the higher feature degree.

9. The road surface state determination device according to claim 4, wherein:
the vehicle-body-side system further includes a support vector storage unit configured to store support vectors of the feature quantities for each type of the road surface, and
the road surface determination unit determines the road surface state based on the feature quantity included in the road surface data and a partial support vector included in the support vectors which corresponds to the feature quantity.

* * * * *